July 4, 1961 R. R. EVANS 2,991,456
DIRECTIONAL DATA TRANSFER APPARATUS
Filed Oct. 18, 1956
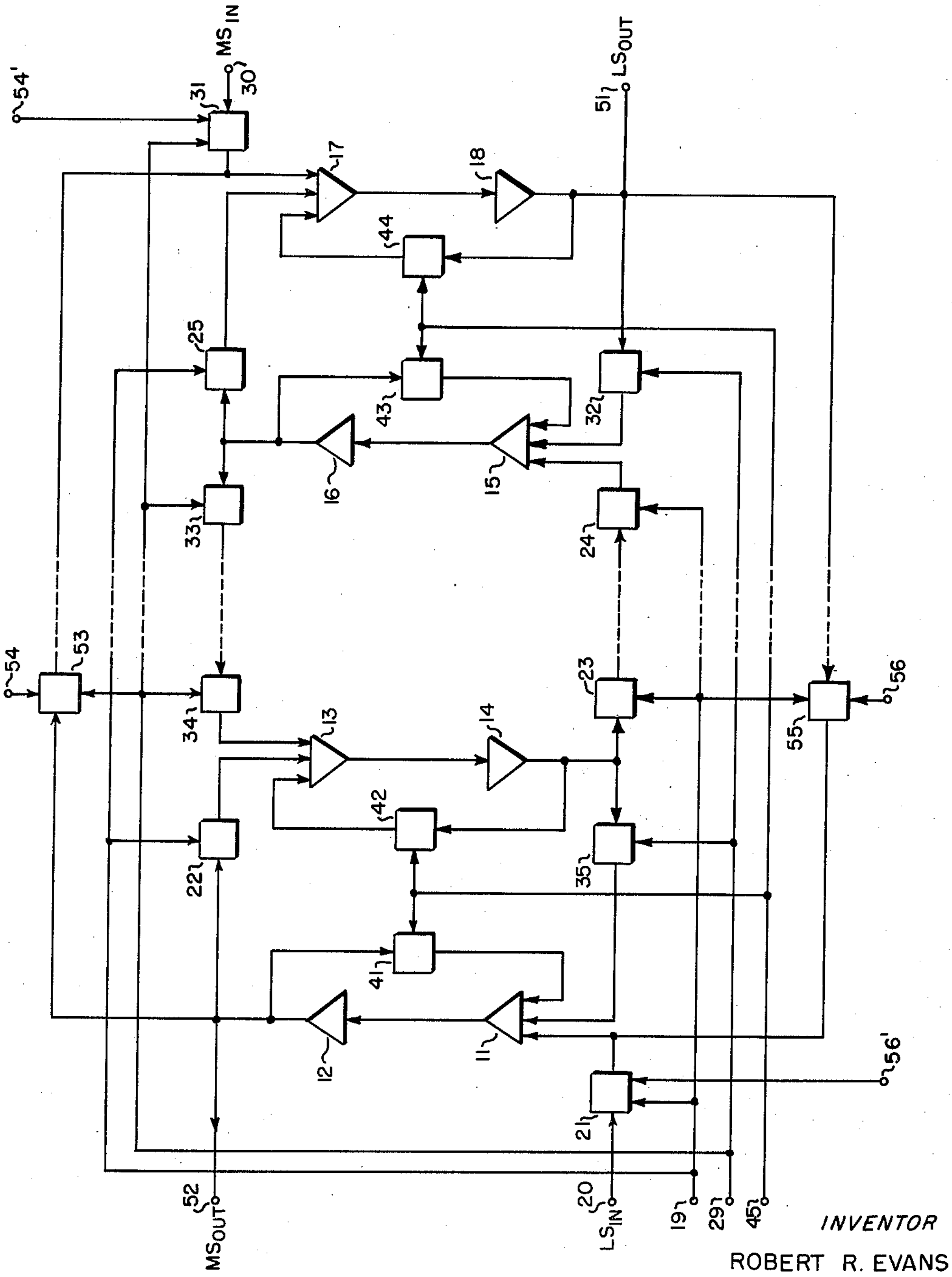
INVENTOR
ROBERT R. EVANS
BY Joseph Weingarten
ATTORNEY United States Patent Office 2,991,456
Patented July 4, 1961

2,991,456

DIRECTIONAL DATA TRANSFER APPARATUS

Robert R. Evans, Bedford, Mass., assignor, by mesne assignments, to Laboratory for Electronics, Inc., Boston, Mass., a corporation of Delaware Filed Oct. 18, 1956, Ser. No. 616,722
5 Claims. (Cl. 340—174)

The present invention relates to directional data transfer apparatus for transferring data in a chosen one of two opposite directions, in particular reversible shift registers adapted to control the flow of binary digital data.

In many portions of a digital computer system, e.g. in the arithmetic unit which performs addition and subtraction, digits of a binary number are normally operated upon in the order of ascending significance. Binary numbers are fed into such a unit with the least significant digit first, the direction of such data flow hereafter being referred to as the LS direction. Frequently, other functions must be performed upon this data, for example data sorting, typing data into the computer or typing it out by means of a monotype device, e.g. a typewriter, where it may be more convenient to treat the most significant digit first. Accordingly, the direction of data flow must be reversed to the most significant first or MS direction. Similarly, it is often desirable to reverse the flow of data in the MS direction, in order to operate on it in the LS domain of the computer.

It will be seen that a need exists for a simple economical device which is capable of selectively transferring binary digital data in the LS or the MS direction. An additional requirement of such a device is the ability to arrest the transfer of data in either direction while retaining the data in place for future use.

Accordingly, it is an object of this invention to provide a reversible shift register capable of accepting binary digital data flowing either in the LS direction or in the MS direction.

It is a further object of this invention to provide dynamic shift registers capable of arresting data transfer thereacross and retaining the binary digits in place for future use.

It is another object of this invention to provide new and improved shift registers capable of transferring binary data stored therein in a forward or reverse direction.

It is an additional object of this invention to provide reversible shift registers capable of recirculating the binary digital data stored therein in both an LS or an MS direction.

These and other novel features of my invention together with further objects and advantages thereof will become more apparent from the following detailed specification with reference to the accompanying drawings, the sole figure of which illustrates a preferred embodiment of the invention.

Briefly stated, the invention comprises a sequence of data storage units, each unit consisting of an input and an output magnetic amplifier. Successive storage units of the sequence are connected by respective gates of a first set, each output amplifier linking the input amplifier of the subsequent storage unit. Additionally, the output amplifier of each storage unit is connected to the input amplifier of the preceding unit of the sequence by respective gates of a second set. The two sets of gates are responsice to different signals to provide data transfer in an LS or an MS direction. The output of each data storage unit is connected to the input of the same unit by a separate gate belonging to a third set of gates, in order to provide a data recirculation path within the unit upon the actuation of the last mentioned gate. The outputs of the first and last storage unit of the entire sequence are linked respectively to the inputs of the last and first storage units through appropriate gates of respective first and second sets to provide unidirectional data recirculation paths in the LS and MS directions.

With reference now to the figure, a shift register is shown which consists of "and" gates, amplifiers and buffers. The gates are indicated by squares in the drawing and are of the type which yields an output signal only when there is a signal on every one of the gate inputs. Each magnetic amplifier is indicated by a triangle, the apex pointing in the direction of data transfer. Each amplifier comprises a magnetic core which stores a binary digit for half a bit period, whence the amplifier is pulsed and the digit is passed on to the data to the next amplifier which is pulsed in alternation therewith. A buffer is indicated by the arrowheads at the base of a triangle, indicating that an amplifier output signal is obtained when there is a signal on any one of the inputs. Each storage unit is shown to include a pair of magnetic amplifiers comprising alternately pulsed input and output amplifiers 11—12, 13—14, 15—16, and 17—18. It will be understood that any number of storage units may be provided, depending only on the number of digits in the binary number it is desired to store. This is indicated in the drawing by the broken line appearing in the register connections. An input terminal 20, adapted to receive a binary digital number flowing in the LS direction, is connected to a gate 21, the output of which is connected to the input of amplifier 11. Gate 21 together with gates 22, 23, 24, 25 and 55 comprises a first set of gates, each of which is connected to a terminal 19 so that a first signal applied thereto will actuate said gates to permit data transfer in the LS direction. Input terminal 30 is adapted to receive binary digital data flowing in the MS direction and is connected to a gate 31, the output of which is connected to the input of amplifier 17. Gate 31 together with gates 32, 33, 34, 35 and 53 comprises a second set of gates, each of which is connected to a terminal 29 adapted to receive a second signal to transfer the data in the MS direction. Respective gates 41, 42, 43 and 44 which comprise a third set of gates, are connected to a terminal 45 which is adapted to receive a signal that will recirculate the particular digit contained in each storage unit in place. Each one of said third set of gates has its input connected to the output of the even numbered output amplifiers of respective storage units, while the output of each of said gates is buffered to the input of the odd numbered input amplifiers of respective storage units. Terminal 51 which is used to transfer data out of the shift register in the LS direction, is connected to the output of amplifier 18. Similarly, terminal 52 which is used to transfer data out of the shift register in the MS direction, is connected to the output of amplifier 12. Each of the last mentioned output terminals is linked to the corresponding input terminal by respective gates 53 and 55 to provide data recirculation loops in the LS and in the MS direction respectively. Terminal 54 supplies an MS recirculation signal to gate 53, while the inverse of the last mentioned signal is supplied to gate 31 from terminal 54'. Terminal 56 supplies an LS recirculation signal to gate 55, while the inverse of this signal is derived from terminal 56' which is further connected to gate 21.

In operation, when the shift register described above works in conjunction with the LS domain of a computer, data flowing in the LS direction will be applied to input terminal 20. A signal applied to the first set of gates via terminal 19 will keep these gates open to allow data transfer across the register in a LS direction, all other gates remaining closed at this time. Accordingly, binary digits entering the register in LS order at terminal 20, will be transferred across gate 21, amplifiers 11 and 12, gate 22, amplifiers 13 and 14, gate 23, gate 24, amplifiers 15 and 16, gate 25 and amplifiers 17 and 18. It will be understood that data flowing from the output of amplifier 12 to the input of gate 22, becomes simultaneously available at MS output terminal 52. Generally, it is unnecessary to provide means for preventing the appearance of the latter signal, since the apparatus connected to terminal 52 is incapable of accepting data during the period of LS data flow. Accordingly, the latter signal will be without effect. Since the operation of the register is dynamic, the data contained therein must move every time the magnetic cores are pulsed, i.e. every half bit time. If it is now desired to recirculate the binary number in the register, a signal derived from terminal 56 will open gate 55 and permit data transfer from the output of amplifier 18 to the input of amplifier 11. At the same time, the signal derived from terminal 56' shuts off gate 21. Accordingly, the binary digits will be recirculated across the register in an LS direction. Alternatively, it may be desired to retain the particular binary digits contained within respective storage units for future use. This is accomplished by applying a signal to terminal 45 while the signals applied to terminals 19 and 29 are shut off. Accordingly, respective gates of the third set will open while all other gates remain closed. The information transferred from the input of amplifier 11 to the output of amplifier 12 is then recirculated by means of gate 41, whereupon it is again buffered to the input of amplifier 11. The process is identical in all other storage units of the shift register. Frequently, the binary number received by the register in the LS direction via terminal 20, is to be transferred out in the reverse direction via output terminal 52, to be used in the MS domain of the computer. This is accomplished by applying a reversing signal to terminal 29 after all the digits of the binary number have entered the register, while the signals applied to terminals 19 and 45 are shut off. With the exception of gate 54, the gates of the second set will now open while all other gates are closed. The digits of the binary number stored in respective storage units of the shift register, will be transferred out in the MS direction, the least significant digit, stored in the storage unit comprising amplifiers 17 and 18, being transferred out last. The path of the aforementioned least significant digit will be as follows: From the output of amplifier 18 to gate 32, amplifiers 15 and 16, gate 33, gate 34, amplifiers 13 and 14, gate 35 and amplifiers 11 and 12, to output terminal 52. Similarly to the situation mentioned above, the apparatus connected to terminal 51 will be incapable of accepting data during the period of MS data flow. Accordingly, the appearance of a signal at terminal 51 during this period will be without effect. The operation of the shift register in the case of data originally fed into the apparatus in the MS direction, is essentially the reverse of the operation just described.

Having thus described the invention, it will be apparent that numerous modifications and departures as explained above, may now be made by those skilled in the art, all of which fall within the scope contemplated by the invention. Consequently, the invention herein disclosed is to be construed as limited only by the spirit and scope of the appended claims.

What is claimed is:

1. A reversible shift register for transferring binary numbers in one of two opposite directions comprising a sequence of pairs of series-connected input and output magnetic amplifiers, means for cyclically pulsing the input amplifiers of said sequence in alternation with said output amplifiers to transfer binary digits of said numbers thereacross, a first set of gates responsive to a first signal, respective gates of said first set being connected between the output amplifier of each pair of said sequence and the input amplifier of the subsequent pair to permit data transfer in a least significant digit first direction, a second set of gates responsive to a second signal, respective gates of said second set being connected between the output amplifier of each pair of said sequence and the input amplifier of the preceding pair to permit data transfer in the most significant digit first direction, said signals being adapted to actuate said register selectively to accept the digits of a binary number at the input amplifier of a chosen one of the first and the last pair of said sequence.

2. The apparatus of claim 1 and further comprising a third set of gates responsive to a third signal, respective gates of said third set being connected between the output and input amplifiers of each pair, and means for selectively actuating said register with said third signal upon the cessation of said first and second signals to arrest data transfer between respective amplifier pairs of said sequence while recirculating the binary digit contained within each pair.

3. Directional data transfer apparatus comprising a sequence of data storage units each having an output and an input, each output being linked by a gate to the input of the subsequent storage unit of said sequence to permit data transfer in one direction, each output being further linked by a gate to the input of the preceding unit of said sequence to permit data transfer in the opposite direction, means for selectively applying a first signal to the gates linking succeeding storage units, means for selectively applying a second signal to the gates linking preceding storage units, said signals actuating said gates to provide data transfer in a chosen one of said two directions, each of said storage units being adapted to store a single digit of a binary number, said gates being adapted for selective actuation by said signals to enable said sequence of storage units to receive the least significant digit of said binary number first at the input of the first sequence unit or to receive the most significant digit first at the input of the last sequence unit, and to transfer out the binary number so received to the output of the receiving unit at the opposite end of said sequence, each of said storage units comprising a pair of series-connected magnetic amplifiers, means for cyclically pulsing said amplifiers in alternation to transfer data thereacross, a gate connected between the output and input of each storage unit, and means for selectively applying a third signal to each of said last recited gates to cyclically recirculate the digit stored within each unit.

4. Directional data transfer apparatus in accordance with claim 3 and further including a gate connected in series with each input amplifier of respective first and last storage units of said sequence, a gate connected between the output amplifier of respective first and last storage units and corresponding input amplifier at the opposite end of said sequence, said gates being responsive to said first or second signals respectively to permit the recirculation of the binary number contained in said sequence of storage units in a chosen direction.

5. Data signal transfer apparatus comprising, a sequence of data storage elements, each storage element having an input and an output, signal control means connecting each of the storage element outputs to the inputs of the succeeding and following ones of said storage elements in the sequence, means for selectively actuating the signal control means for causing data signal transfer through the sequence of storage elements in either one of the two possible directions, means selectively operative for connecting the output of the last storage element of the sequence in the direction of transfer to the input of the first storage element to permit data signals to be recirculated through the sequence of storage elements, each of the storage elements including means for recirculating data signals therein, and means for selectively actuating the control means for precluding data signal transfer through the sequence while recirculating within each of the storage elements the data signals stored therein.

(References on following page)

References Cited in the file of this patent

UNITED STATES PATENTS

| | | |
|---|---|---|
| 2,708,722 | An Wang | May 17, 1955 |
| 2,781,503 | Saunders | Feb. 12, 1957 |
| 2,831,150 | Wright et al. | Apr. 15, 1958 |
| 2,834,006 | Kaufmann | May 6, 1958 |
| 2,834,007 | Smith | May 6, 1958 |
| 2,907,003 | Hobbs | Sept. 29, 1959 |
| 2,911,622 | Ayres | Nov. 3, 1959 |